US009354982B2

(12) United States Patent
Weiss et al.

(10) Patent No.: US 9,354,982 B2
(45) Date of Patent: *May 31, 2016

(54) MANIPULATING ELECTRONIC BACKUPS

(71) Applicant: Apple Inc., Cupertino, CA (US)

(72) Inventors: Eric A. Weiss, Paris (FR); Pavel Cisler, Los Gatos, CA (US); Peter McInerney, Los Gatos, CA (US); Dominic B. Giampaolo, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,772

(22) Filed: Jan. 23, 2015

(65) Prior Publication Data

US 2015/0142746 A1    May 21, 2015

Related U.S. Application Data

(63) Continuation of application No. 13/669,099, filed on Nov. 5, 2012, now Pat. No. 8,965,929, which is a continuation of application No. 11/760,604, filed on Jun. 8, 2007, now Pat. No. 8,307,004.

(51) Int. Cl.
*G06F 17/30* (2006.01)
*G06F 11/14* (2006.01)

(52) U.S. Cl.
CPC ........ *G06F 11/1458* (2013.01); *G06F 11/1451* (2013.01); *G06F 11/1466* (2013.01); *G06F 11/1461* (2013.01); *G06F 17/30* (2013.01)

(58) Field of Classification Search
CPC ..................................................... G06F 17/30
USPC .................................................. 707/600–899
See application file for complete search history.

(56) References Cited

U.S. PATENT DOCUMENTS

| 5,150,407 A | 9/1992 | Chan |
| 5,150,473 A | 9/1992 | Zulch |
| 5,163,148 A | 11/1992 | Walls |
| 5,276,867 A | 1/1994 | Kenley et al. |

(Continued)

FOREIGN PATENT DOCUMENTS

| EP | 629950 | 12/1997 |
| EP | 1152352 | 11/2001 |

(Continued)

OTHER PUBLICATIONS

Anonymous, "ForeverSave Version 1.1.3", Published Jan. 1, 2009, 16 pgs [online]. Retrieved from the Internet: <URL: http://tool-forcesw.com/docs/ForeverSave_Manual.pdf>.

(Continued)

*Primary Examiner* — Isaac M Woo
(74) *Attorney, Agent, or Firm* — Fish & Richardson P.C.

(57) ABSTRACT

Systems and methods are provided for storing and restoring digital data. In some implementations, a method is provided. The method includes initiating a backup operation of data including a plurality of items, interrupting the backup operation, where interrupting occurs after a portion of the data has been completed, receiving an input to resume the backup operation, identifying a previously completed portion of the backup data, and performing a backup of a remaining uncompleted portion of the backup data. Other embodiments of this aspect include corresponding systems, apparatus, computer program products, and computer readable media.

18 Claims, 7 Drawing Sheets

(56) References Cited

U.S. PATENT DOCUMENTS

| | | |
|---|---|---|
| 5,349,658 A | 9/1994 | O'Rourke et al. |
| 5,369,570 A | 11/1994 | Parad |
| 5,574,846 A | 11/1996 | Yoshimura et al. |
| 5,659,614 A | 8/1997 | Bailey |
| 5,664,186 A | 9/1997 | Bennett et al. |
| 5,680,562 A | 10/1997 | Conrad et al. |
| 5,736,974 A | 4/1998 | Selker |
| 5,745,669 A | 4/1998 | Hugard et al. |
| 5,754,178 A | 5/1998 | Johnston et al. |
| 5,758,359 A | 5/1998 | Saxon |
| 5,790,120 A | 8/1998 | Lozares et al. |
| 5,802,175 A | 9/1998 | Kara |
| 5,818,936 A | 10/1998 | Mashayekhi |
| 5,819,032 A | 10/1998 | De Vries et al. |
| 5,819,292 A | 10/1998 | Hitz et al. |
| 5,831,617 A | 11/1998 | Bhukhanwala |
| 5,832,526 A | 11/1998 | Schuyler |
| 5,961,605 A | 10/1999 | Deng et al. |
| 5,987,566 A | 11/1999 | Vishlitzky et al. |
| 6,006,227 A | 12/1999 | Freeman et al. |
| 6,023,506 A | 2/2000 | Ote et al. |
| 6,054,989 A | 4/2000 | Robertson et al. |
| 6,097,313 A | 8/2000 | Takahashi et al. |
| 6,112,318 A | 8/2000 | Jouppi et al. |
| 6,121,969 A | 9/2000 | Jain et al. |
| 6,134,660 A | 10/2000 | Boneh et al. |
| 6,167,532 A | 12/2000 | Wisecup |
| 6,188,405 B1 | 2/2001 | Czerwinski et al. |
| 6,269,381 B1 | 7/2001 | St. Pierre et al. |
| 6,366,988 B1 | 4/2002 | Skiba et al. |
| 6,396,500 B1 | 5/2002 | Qureshi et al. |
| 6,397,308 B1 | 5/2002 | Ofek et al. |
| 6,424,626 B1 | 7/2002 | Kidambi et al. |
| 6,460,055 B1 | 10/2002 | Midgley et al. |
| 6,493,745 B1 | 12/2002 | Cherian |
| 6,553,392 B1 | 4/2003 | Mosher, Jr. et al. |
| 6,574,733 B1 | 6/2003 | Langford |
| 6,600,501 B1 | 7/2003 | Israel et al. |
| 6,604,118 B2 | 8/2003 | Kleiman et al. |
| 6,625,704 B2 | 9/2003 | Winokur |
| 6,629,129 B1 | 9/2003 | Bookspan et al. |
| 6,636,937 B2 | 10/2003 | Peter |
| 6,638,313 B1 | 10/2003 | Freeman et al. |
| 6,701,454 B1 | 3/2004 | Fischer et al. |
| 6,711,572 B2 | 3/2004 | Zakharov et al. |
| 6,714,201 B1 | 3/2004 | Grinstein et al. |
| 6,714,952 B2 | 3/2004 | Dunham et al. |
| 6,724,918 B1 | 4/2004 | Yen et al. |
| 6,725,427 B2 | 4/2004 | Freeman et al. |
| 6,728,735 B1 | 4/2004 | Fong |
| 6,750,890 B1 | 6/2004 | Sugimoto |
| 6,760,723 B2 | 7/2004 | Oshinsky et al. |
| 6,768,999 B2 | 7/2004 | Prager et al. |
| 6,785,751 B1 | 8/2004 | Connor |
| 6,785,786 B1 | 8/2004 | Gold et al. |
| 6,801,229 B1 | 10/2004 | Tinkler |
| 6,836,657 B2 | 12/2004 | Ji et al. |
| 6,857,001 B2 | 2/2005 | Hitz et al. |
| 6,892,211 B2 | 5/2005 | Hitz et al. |
| 6,901,493 B1 | 5/2005 | Maffezzoni |
| 6,918,124 B1 | 7/2005 | Novik et al. |
| 6,947,556 B1 | 9/2005 | Matyas et al. |
| 6,948,039 B2 | 9/2005 | Biessener et al. |
| 6,959,368 B1 | 10/2005 | St. Pierre et al. |
| 6,993,710 B1 | 1/2006 | Coad et al. |
| 7,069,402 B2 | 6/2006 | Coulter et al. |
| 7,072,916 B1 | 7/2006 | Lewis et al. |
| 7,099,900 B1 | 8/2006 | Bromley et al. |
| 7,103,740 B1 | 9/2006 | Colgrove et al. |
| 7,107,527 B2 | 9/2006 | Takahashi et al. |
| 7,111,136 B2 | 9/2006 | Yamagami |
| 7,133,902 B2 | 11/2006 | Saha et al. |
| 7,134,026 B2 | 11/2006 | Horiuchi et al. |
| 7,155,486 B2 | 12/2006 | Aoshima et al. |
| 7,174,352 B2 | 2/2007 | Kleiman et al. |
| 7,185,028 B2 | 2/2007 | Lechner |
| 7,200,617 B2 | 4/2007 | Kibuse |
| 7,213,040 B1 | 5/2007 | Stokes |
| 7,222,194 B2 | 5/2007 | Kano et al. |
| 7,257,717 B2 | 8/2007 | Huang |
| 7,275,075 B2 | 9/2007 | Cannon |
| 7,284,190 B2 | 10/2007 | Chellis et al. |
| 7,289,973 B2 | 10/2007 | Kiessig et al. |
| 7,318,134 B1 | 1/2008 | Oliveira et al. |
| 7,320,076 B2 | 1/2008 | Caronni |
| 7,386,801 B1 | 6/2008 | Horvitz et al. |
| 7,401,194 B2 | 7/2008 | Jewell |
| 7,418,619 B1 | 8/2008 | Uhlmann et al. |
| 7,434,164 B2 | 10/2008 | Salesin et al. |
| 7,434,177 B1 | 10/2008 | Ording et al. |
| 7,440,125 B2 | 10/2008 | Maekawa et al. |
| 7,483,693 B2 | 1/2009 | Lueng et al. |
| 7,505,762 B2 | 3/2009 | Onyon et al. |
| 7,518,611 B2 | 4/2009 | Boyd et al. |
| 7,558,930 B2 | 7/2009 | Kitamura et al. |
| 7,559,016 B1 | 7/2009 | Rakowski et al. |
| 7,574,459 B2 | 8/2009 | Sen et al. |
| 7,590,668 B2 | 9/2009 | Kathuria et al. |
| 7,596,586 B2 | 9/2009 | Gokhale et al. |
| 7,600,133 B2 | 10/2009 | Long et al. |
| 7,624,133 B1 | 11/2009 | Ojalvo |
| 7,630,021 B2 | 12/2009 | Matsuzaka et al. |
| 7,657,450 B2 | 2/2010 | Amit et al. |
| 7,660,817 B2 | 2/2010 | Smith et al. |
| 7,669,141 B1 | 2/2010 | Pegg |
| 7,676,689 B1 | 3/2010 | Shioyama et al. |
| 7,703,044 B2 | 4/2010 | Graham |
| 7,711,771 B2 | 5/2010 | Kirnos |
| 7,716,171 B2 | 5/2010 | Kryger |
| 7,734,594 B2 | 6/2010 | Wang |
| 7,735,018 B2 | 6/2010 | Bakhash |
| 7,739,464 B1 | 6/2010 | Coulter et al. |
| 7,739,622 B2 | 6/2010 | DeLine et al. |
| 7,743,347 B2 | 6/2010 | Graham et al. |
| 7,747,655 B2 | 6/2010 | Hull et al. |
| 7,752,573 B2 | 7/2010 | Shiba et al. |
| 7,774,718 B2 | 8/2010 | Finke-Anlauff et al. |
| 7,788,080 B2 | 8/2010 | Graham et al. |
| 7,788,592 B2 | 8/2010 | Williams et al. |
| 7,800,615 B2 | 9/2010 | MacPherson |
| 7,809,687 B2 | 10/2010 | Cisler et al. |
| 7,809,688 B2 | 10/2010 | Cisler et al. |
| 7,836,311 B2 | 11/2010 | Kuriya et al. |
| 7,853,566 B2 | 12/2010 | Cisler et al. |
| 7,853,567 B2 | 12/2010 | Cisler et al. |
| 7,856,424 B2 | 12/2010 | Cisler et al. |
| 7,860,839 B2 | 12/2010 | Cisler et al. |
| 7,882,072 B1 | 2/2011 | Axe et al. |
| 7,899,829 B1 | 3/2011 | Malla |
| 7,934,064 B1 | 4/2011 | Per et al. |
| 7,953,730 B1 | 5/2011 | Bleckner |
| 7,974,948 B2 | 7/2011 | Baer et al. |
| 7,999,810 B1 | 8/2011 | Boice et al. |
| 8,010,900 B2 | 8/2011 | Hart et al. |
| 8,055,911 B2 | 11/2011 | Feng et al. |
| 8,099,392 B2 | 1/2012 | Paterson et al. |
| 8,161,410 B2 | 4/2012 | Bray |
| 8,166,415 B2 | 4/2012 | Cisler et al. |
| 8,209,308 B2 | 6/2012 | Rueben et al. |
| 8,229,897 B2 | 7/2012 | Cannon et al. |
| 8,234,591 B1 | 7/2012 | Dhawan et al. |
| 8,311,988 B2 | 11/2012 | Cisler et al. |
| 8,375,318 B2 | 2/2013 | Masuda et al. |
| 8,839,087 B1 | 9/2014 | Hayden |
| 9,009,115 B2 | 4/2015 | Cisler et al. |
| 2001/0047368 A1 | 11/2001 | Oshinsky et al. |
| 2002/0016912 A1 | 2/2002 | Johnson |
| 2002/0023198 A1 | 2/2002 | Kokubun et al. |
| 2002/0046220 A1 | 4/2002 | Freeman et al. |
| 2002/0049883 A1 | 4/2002 | Schneider et al. |
| 2002/0054158 A1 | 5/2002 | Asami |
| 2002/0063737 A1 | 5/2002 | Feig et al. |
| 2002/0065999 A1 | 5/2002 | Kikuchi et al. |
| 2002/0075322 A1 | 6/2002 | Rosenzweig et al. |

(56) References Cited

U.S. PATENT DOCUMENTS

| | | |
|---|---|---|
| 2002/0080180 A1 | 6/2002 | Mander et al. |
| 2002/0107886 A1 | 8/2002 | Gentner et al. |
| 2002/0112237 A1 | 8/2002 | Kelts |
| 2002/0120648 A1 | 8/2002 | Ball et al. |
| 2002/0156921 A1 | 10/2002 | Dutta et al. |
| 2002/0160760 A1 | 10/2002 | Aoyama |
| 2002/0174283 A1 | 11/2002 | Lin |
| 2003/0016248 A1 | 1/2003 | Ubillos |
| 2003/0018878 A1 | 1/2003 | Dorward et al. |
| 2003/0038831 A1 | 2/2003 | Engelfriet |
| 2003/0050940 A1 | 3/2003 | Robinson |
| 2003/0063128 A1 | 4/2003 | Salmimaa et al. |
| 2003/0065687 A1 | 4/2003 | Momiji et al. |
| 2003/0097640 A1 | 5/2003 | Abrams et al. |
| 2003/0122874 A1 | 7/2003 | Dieberger et al. |
| 2003/0126247 A1 | 7/2003 | Strasser et al. |
| 2003/0131007 A1 | 7/2003 | Schirmer et al. |
| 2003/0135650 A1 | 7/2003 | Kano et al. |
| 2003/0137540 A1 | 7/2003 | Klevenz et al. |
| 2003/0167380 A1 | 9/2003 | Green |
| 2003/0172937 A1 | 9/2003 | Faries et al. |
| 2003/0177149 A1 | 9/2003 | Coombs |
| 2003/0195903 A1 | 10/2003 | Manley et al. |
| 2003/0220949 A1 | 11/2003 | Witt et al. |
| 2004/0003351 A1 | 1/2004 | Sommerer et al. |
| 2004/0044707 A1 | 3/2004 | Richard |
| 2004/0066414 A1 | 4/2004 | Czerwinski et al. |
| 2004/0073560 A1 | 4/2004 | Edwards |
| 2004/0078641 A1 | 4/2004 | Fleischmann |
| 2004/0088331 A1 | 5/2004 | Therrien et al. |
| 2004/0117459 A1 | 6/2004 | Fry |
| 2004/0125137 A1 | 7/2004 | Stata et al. |
| 2004/0125150 A1 | 7/2004 | Adcock et al. |
| 2004/0133575 A1 | 7/2004 | Farmer et al. |
| 2004/0139396 A1 | 7/2004 | Gelernter et al. |
| 2004/0143652 A1 | 7/2004 | Grannan et al. |
| 2004/0153973 A1 | 8/2004 | Horwitz |
| 2004/0163009 A1 | 8/2004 | Goldstein et al. |
| 2004/0167942 A1 | 8/2004 | Oshinsky et al. |
| 2004/0175000 A1 | 9/2004 | Caronni |
| 2004/0193953 A1 | 9/2004 | Callahan et al. |
| 2004/0199779 A1 | 10/2004 | Huang |
| 2004/0199826 A1 | 10/2004 | Bertram et al. |
| 2004/0210608 A1 | 10/2004 | Lee et al. |
| 2004/0220965 A1 | 11/2004 | Harville et al. |
| 2004/0220980 A1 | 11/2004 | Forster |
| 2004/0222992 A1 | 11/2004 | Calkins et al. |
| 2004/0228493 A1 | 11/2004 | Ma |
| 2004/0230892 A1 | 11/2004 | Horton |
| 2004/0235523 A1 | 11/2004 | Schrire et al. |
| 2004/0236769 A1 | 11/2004 | Smith et al. |
| 2004/0236916 A1 | 11/2004 | Berkowitz et al. |
| 2004/0236958 A1 | 11/2004 | Teicher et al. |
| 2004/0267700 A1 | 12/2004 | Dumais et al. |
| 2005/0010955 A1 | 1/2005 | Elia et al. |
| 2005/0047295 A1 | 3/2005 | Kim et al. |
| 2005/0071390 A1 | 3/2005 | Midgley et al. |
| 2005/0086613 A1 | 4/2005 | McKnight et al. |
| 2005/0091596 A1 | 4/2005 | Anthony et al. |
| 2005/0097475 A1 | 5/2005 | Makioka et al. |
| 2005/0102329 A1 | 5/2005 | Jiang et al. |
| 2005/0102695 A1 | 5/2005 | Musser |
| 2005/0108253 A1 | 5/2005 | Metsatahti et al. |
| 2005/0138013 A1 | 6/2005 | Walker et al. |
| 2005/0138066 A1 | 6/2005 | Finke-Anlauff et al. |
| 2005/0138081 A1 | 6/2005 | Alshab et al. |
| 2005/0144135 A1 | 6/2005 | Juarez et al. |
| 2005/0149577 A1 | 7/2005 | Okada et al. |
| 2005/0165867 A1 | 7/2005 | Barton et al. |
| 2005/0187992 A1 | 8/2005 | Prahlad et al. |
| 2005/0204186 A1 | 9/2005 | Rothman et al. |
| 2005/0216520 A1 | 9/2005 | He et al. |
| 2005/0216527 A1 | 9/2005 | Erlingsson |
| 2005/0246398 A1 | 11/2005 | Barzilai et al. |
| 2005/0262168 A1 | 11/2005 | Helliker et al. |
| 2005/0262377 A1 | 11/2005 | Sim-Tang |
| 2006/0026218 A1 | 2/2006 | Urmston |
| 2006/0041603 A1 | 2/2006 | Paterson et al. |
| 2006/0041823 A1 | 2/2006 | Wolfgang et al. |
| 2006/0053332 A1 | 3/2006 | Uhlmann |
| 2006/0064444 A1 | 3/2006 | Van Ingen et al. |
| 2006/0064634 A1 | 3/2006 | Dettinger et al. |
| 2006/0080521 A1 | 4/2006 | Barr et al. |
| 2006/0085792 A1 | 4/2006 | Traut |
| 2006/0085817 A1 | 4/2006 | Kim et al. |
| 2006/0088167 A1 | 4/2006 | Bade et al. |
| 2006/0101384 A1 | 5/2006 | Sim-Tang et al. |
| 2006/0106893 A1 | 5/2006 | Daniels et al. |
| 2006/0117022 A1 | 6/2006 | Lucas |
| 2006/0117309 A1 | 6/2006 | Singhal et al. |
| 2006/0137010 A1 | 6/2006 | Kramer et al. |
| 2006/0143250 A1 | 6/2006 | Peterson et al. |
| 2006/0150107 A1 | 7/2006 | Leung et al. |
| 2006/0156246 A1 | 7/2006 | Williams et al. |
| 2006/0156259 A1 | 7/2006 | Wagner et al. |
| 2006/0161861 A1 | 7/2006 | Holecek et al. |
| 2006/0173848 A1 | 8/2006 | Peterson et al. |
| 2006/0206460 A1 | 9/2006 | Gadkari |
| 2006/0218363 A1 | 9/2006 | Palapudi |
| 2006/0224956 A1 | 10/2006 | Storisteanu et al. |
| 2006/0235907 A1* | 10/2006 | Kathuria et al. .............. 707/204 |
| 2006/0236406 A1 | 10/2006 | Johnson |
| 2006/0248294 A1 | 11/2006 | Nedved et al. |
| 2006/0253470 A1 | 11/2006 | Friedman et al. |
| 2006/0288205 A1 | 12/2006 | Linares |
| 2007/0015118 A1 | 1/2007 | Nickell et al. |
| 2007/0027935 A1 | 2/2007 | Haselton et al. |
| 2007/0030528 A1 | 2/2007 | Quaeler et al. |
| 2007/0038884 A1 | 2/2007 | Campbell et al. |
| 2007/0043715 A1 | 2/2007 | Kaushik et al. |
| 2007/0043790 A1 | 2/2007 | Kryger |
| 2007/0070066 A1 | 3/2007 | Bakhash |
| 2007/0078910 A1 | 4/2007 | Bopardikar |
| 2007/0088702 A1 | 4/2007 | Fridella et al. |
| 2007/0094312 A1 | 4/2007 | Sim-Tang |
| 2007/0106978 A1 | 5/2007 | Felts |
| 2007/0130232 A1 | 6/2007 | Therrien et al. |
| 2007/0136381 A1 | 6/2007 | Cannon et al. |
| 2007/0136389 A1 | 6/2007 | Bergant et al. |
| 2007/0156772 A1 | 7/2007 | Lechner |
| 2007/0168497 A1 | 7/2007 | Locker et al. |
| 2007/0180268 A1 | 8/2007 | Filimon et al. |
| 2007/0185879 A1 | 8/2007 | Roublev et al. |
| 2007/0185922 A1 | 8/2007 | Kapoor et al. |
| 2007/0186127 A1 | 8/2007 | Desai et al. |
| 2007/0192386 A1 | 8/2007 | Fries et al. |
| 2007/0245238 A1 | 10/2007 | Fugitt et al. |
| 2007/0266007 A1 | 11/2007 | Arrouye et al. |
| 2007/0271263 A1 | 11/2007 | Merrild |
| 2007/0271303 A1 | 11/2007 | Menendez et al. |
| 2007/0288536 A1 | 12/2007 | Sen et al. |
| 2008/0016576 A1 | 1/2008 | Ueda et al. |
| 2008/0022393 A1 | 1/2008 | Waltermann et al. |
| 2008/0028007 A1 | 1/2008 | Ishii et al. |
| 2008/0033969 A1 | 2/2008 | Koo et al. |
| 2008/0034004 A1 | 2/2008 | Cisler et al. |
| 2008/0034011 A1 | 2/2008 | Cisler et al. |
| 2008/0034017 A1 | 2/2008 | Giampaolo et al. |
| 2008/0034019 A1 | 2/2008 | Cisler et al. |
| 2008/0046557 A1 | 2/2008 | Cheng |
| 2008/0065663 A1 | 3/2008 | Farlee et al. |
| 2008/0070496 A1 | 3/2008 | Jackson |
| 2008/0071796 A1 | 3/2008 | Ghuneim |
| 2008/0077808 A1 | 3/2008 | Teicher et al. |
| 2008/0082578 A1 | 4/2008 | Hogue et al. |
| 2008/0091655 A1 | 4/2008 | Gokhale et al. |
| 2008/0126442 A1 | 5/2008 | Cisler et al. |
| 2008/0133487 A1 | 6/2008 | Gross |
| 2008/0141029 A1 | 6/2008 | Culver |
| 2008/0168184 A1 | 7/2008 | Freedman et al. |
| 2008/0168245 A1 | 7/2008 | De Atley et al. |
| 2008/0168391 A1 | 7/2008 | Robbin et al. |
| 2008/0172607 A1 | 7/2008 | Baer |
| 2008/0177961 A1 | 7/2008 | McSharry et al. |

(56) References Cited

U.S. PATENT DOCUMENTS

| | | |
|---|---|---|
| 2008/0208630 A1 | 8/2008 | Fors et al. |
| 2008/0214163 A1 | 9/2008 | Onyon et al. |
| 2008/0216011 A1 | 9/2008 | Gould |
| 2008/0222512 A1 | 9/2008 | Albornoz et al. |
| 2008/0229037 A1 | 9/2008 | Bunte et al. |
| 2008/0250314 A1 | 10/2008 | Larsen |
| 2008/0250342 A1 | 10/2008 | Clark et al. |
| 2008/0256138 A1 | 10/2008 | Sim-Tang |
| 2008/0285754 A1 | 11/2008 | Kezmann |
| 2008/0307017 A1 | 12/2008 | Lyons et al. |
| 2008/0307020 A1 | 12/2008 | Ko et al. |
| 2008/0307347 A1 | 12/2008 | Cisler et al. |
| 2008/0310628 A1 | 12/2008 | Fujioka et al. |
| 2008/0310633 A1 | 12/2008 | Brown et al. |
| 2008/0313243 A1 | 12/2008 | Poston et al. |
| 2009/0019291 A1 | 1/2009 | Murray |
| 2009/0031401 A1 | 1/2009 | Cudich et al. |
| 2009/0052669 A1 | 2/2009 | Ma |
| 2009/0307333 A1 | 12/2009 | Welingkar et al. |
| 2010/0017855 A1 | 1/2010 | Johnson et al. |
| 2010/0063960 A1 | 3/2010 | Lehto |
| 2010/0070844 A1 | 3/2010 | Aymeloglu et al. |
| 2010/0169823 A1 | 7/2010 | Audet |
| 2010/0217929 A1 | 8/2010 | Kirshenbaum et al. |
| 2011/0016089 A1 | 1/2011 | Freedman et al. |
| 2011/0083098 A1 | 4/2011 | Cisler et al. |
| 2011/0202763 A1 | 8/2011 | Martin et al. |
| 2011/0296351 A1 | 12/2011 | Ewing et al. |
| 2011/0302502 A1 | 12/2011 | Hart et al. |
| 2012/0185767 A1 | 7/2012 | Schlegel |
| 2012/0198383 A1 | 8/2012 | Cisler et al. |
| 2012/0246565 A1 | 9/2012 | Kumamoto |
| 2012/0272173 A1 | 10/2012 | Grossman et al. |
| 2013/0066836 A1 | 3/2013 | Weiss et al. |

FOREIGN PATENT DOCUMENTS

| | | |
|---|---|---|
| EP | 1582982 | 10/2005 |
| WO | WO 01/06356 | 1/2001 |
| WO | WO 02/101540 | 12/2002 |
| WO | WO 2005/045756 | 5/2005 |
| WO | WO 2008/019237 | 2/2008 |
| WO | WO 2008/019259 | 2/2008 |

OTHER PUBLICATIONS

"Apple Previews Mac OS X Leopard," Aug. 7, 2006, [Online] [Retrieved on Nov. 26, 2007] Retrieved from the Internet: URL:http://www.apple.com/pr/library/2006/aug/07leopard.html, pp. 1-2.

"Aulaclic: Unit 6. The Recycle Bin," Nov. 2005, [Online] [Retrieved on Nov. 26, 2007] Retrieved from the Internet: URL:http://www.teacherclick.com/winxp/t_6_1.htm, pp. 1-2.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

"MSDN Academic Alliance Developer Center, Curriculum Repository Glossary," [Online] [Retrieved on Apr. 22, 2009] Retrieved from the Internet URL: http://www.academicresourcecenter.net/curriculum/glossary.aspx, 4 pages.

"StorageSync: Backup, Restore, & Synchronization Software User's Guide", SimpleTech, 2003, 100 pages.

"What's New in Word 2002," Wellesly College Information Services Computing Documentation, Jan. 2002, [Online] Retrieved on Aug. 14, 2008] Retrieved from the Internet URL: http://www.wellesley.edu/Computing/Office02/Word02/word02.html, 19 pages.

Bonwick et al., "The Zettabyte File System," [Online] [Retrieved on Jan. 22, 2008] Retrieved from the Internet: URL:http://partneradvantage.sun.com/protected/solaris10/adoptionkit/tech/zfs/zfs_overview.pdf, 13 pages.

Bonwick, "ZFS the Last Word in File Systems," [Online] [Retrieved on Jan. 22, 2008] Retrieved from the Internet: URL:http://opensolaris.org/os/community/zfs/docs/zfs.pdf, 34 pages.

Bott, "Windows XP Backup Made Easy," [Online] [Retrieved on Jul. 7, 2009]; Retrieved from the Internet URL: http://www.microsoft.com/windowsxp/using/setup/learnmore/bott_03july14.mspx, 4 pages.

Charles Rubin, Mary Millhollon and Katherine Murray, "Microsoft Office Word 2003, Official Manual", First Edition, Japan, Nikkei BP Softpress, Jul. 12, 2004, vol. 1, p. 300, 815-818.

Chen et al., "Data Redundancy and Compression Methods for a Disk-based Network Backup System", 2004, IEEE, pp. 1-8.

Engst, "Retrospect 6.0: Powerful Backup Program Adds Panther Compatibility and Enterprise Features," [Online] [Retrieved on Jul. 8, 2009]; Retrieved from the Internet URL: http://www.macworld.com/article/31038/2004/06/retrospect6x0.html, 8 pages.

Communication pursuant to Article 94(3) EPC for Application No. EP 07 813 540.7, dated Jun. 23, 2009, 2 pages.

Extended European Search Report and Written Opinion, European Application No. 11171738.5, Aug. 29, 2011, 5 pages.

Communication pursuant to Article 94(3) EPC for Application No. EP 07 799 899.5, dated May 14, 2009, 2 pages.

Communication pursuant to Article 94(3) EPC for Application No. EP 07 799 899.5, dated Oct. 7, 2009, 4 pages.

Examination Report from European Application No. 07 813 540.7 dated Oct. 27, 2011, 5 pages.

Examination Report from European Application No. 07 813 605.8 dated Oct. 27, 2011, 5 pages.

Extended European Search Report, European Application No. 11184579.8, Nov. 17, 2011, 6 pages.

Godfrey, Michael et al., "Using Original Analysis to Detect Merging and Splitting of Source Code Entities," IEEE Transactions on Software Engineering, vol. 31, No. 2. Feb. 2005. pp. 166-181.

Griffiths, "Leopard first looks: Time Machine," Aug. 8, 2006 [Online] [Retrieved on Nov. 23, 2007] Retrieved from the Internet: URL:http://www.macworld.com/2006/08/firstlooks/leotimemac/index.php?pf=1, pp. 1-2.

Harder, "Microsoft Windows XP System Restore," [Online] [Retrieved on Jul. 7, 2009] Retrieved from the Internet URL: http://msdn.microsoft.com/en-us/library/ms997627.aspx, 8 pages.

In-link files, The Open Group Base, Specifications Issue 6 [online]. IEEE Std 1003.1, 2004 Edition. [retrieved on Apr. 6, 2011]. Retrieved from the Internet:URL:http://pubs.opengroup.org/onlinepubs/009695399/utilities/In.html, 5 pages.

International Search Report and Written Opinion, PCT/US2007/074653, Aug. 14, 2008, 14 pages.

International Search Report and Written Opinion, PCT/US2007/074729, Jul. 12, 2007, 11 pages.

International Search Report and Written Opinion, PCT/US2007/074863 Apr. 21, 2009, 20 pages.

International Search Report and Written Opinion, PCT/US2007/074881, Jul. 12, 2007, 11 pages.

International Search Report and Written Opinion, PCT/US2008/065146, Oct. 31, 2008, 15 pages.

International Search Report and Written Opinion, PCT/US2008/066212, Mar. 9, 2009, 20 pages.

Microsoft Corporation, "Description of the AutoRecover Functions in Excel," [online] Microsoft Corporation, Aug. 10, 2007, Article ID 289273; URL: http://support.microsoft.com/kb/289273/en-us.

Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx , pp. 1-2.

Microsoft-TechNet, "Using Encrypting File System," Nov. 3, 2005, Microsoft, 40 pages.

Office Action dated Feb. 29, 2012 from related Chinese Application No. 200880024710.0, 11 pages.

Posey, Brien M., "Working with the Windows Server 2003 Volume Shadow Copy Service". Published Jun. 24, 2004. http://www.windowsnetworking.com/articles_tutorials/Windows-Server-2003-Volume-Shadow-Copy-Service.html.; 11 pages.

(56) References Cited

OTHER PUBLICATIONS

Rubel, "Easy Automated Snapshot-Style Backups with Rsync," [Online][Retrieved on Nov. 8, 2010] Retrieved from the Internet URL: http://www.mikerubel.org/computers/rsync_snapshots; 18 pages.

Sun Microsystems, Inc., "ZFS On-Disk Specification," Draft: Dec. 9, 2005, [Online] [Retrieved on Jan. 22, 2008]; Retrieved from the Internet URL: http://opensolaris.org/os/community/zfs/docs/ondiskformat0822.pdf, 55 pages.

Tittel, "An EAZ Way to Restore Crippled and Inoperable Systems," ChannelWeb, Apr. 25, 2005, [Online] [Retrieved on Aug. 13, 2008] Retrieved from the Internet URL: http://www.crn.com/white-box/161502165, 10 pages.

Wang et al., "A Secure and Efficient Desktop Backup and Recovery System", 2007, IEEE, pp. 304-309.

Office Action dated Apr. 1, 2015 from related Chinese Application No. 201310073409.1, 13 pages.

* cited by examiner

MANIPULATING ELECTRONIC BACKUPS

CROSS-REFERENCE TO RELATED APPLICATION

This application is a continuation application of and claims priority to U.S. application Ser. No. 13/669,099, filed on Nov. 5, 2012, which is a continuation application of and claims priority to U.S. application Ser. No. 11/760,604, filed on Jun. 8, 2007; the entire disclosures of both applications are incorporated herein by reference.

TECHNICAL FIELD

The disclosed implementations relate generally to storing and restoring digital data.

BACKGROUND

Modern graphical user interfaces allow a large number of graphical objects or items to be displayed on a display screen at the same time. Operating systems, e.g., Apple Mac OS®, provide user interfaces in which a number of graphical user interface windows can be displayed, overlapped, resized, moved, configured, and reformatted according to the needs of a user or a particular application. Taskbars, menus, virtual buttons, and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save the file's current version on a storage device. The next day, however, the user could have had second thoughts about the revisions, or could have come up with new ideas, and therefore opens the file again.

The revision process is usually straightforward if the user wants to add more material to the file or make changes to what is there. But it is typically more difficult for a user who has changed his/her mind about changes that were previously made and wants the file returned to a previous version. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens the document again, it might not be possible to automatically undo any previous edits.

Conventional backup applications allow for the recovery of previously stored data. A backup operation typically must be completed in a single session. If the backup is interrupted, the backup generally must be started over from the beginning.

SUMMARY

Systems and methods are provided for storing and restoring digital data. In general, in one aspect, a method is provided. The method includes initiating a backup operation of data including a plurality of items, interrupting the backup operation, where interrupting occurs after a portion of the data has been completed, receiving an input to resume the backup operation, identifying a previously completed portion of the backup data, and performing a backup of a remaining uncompleted portion of the backup data. Other embodiments of this aspect include corresponding systems, apparatus, computer program products, and computer readable media.

Implementations of the aspect can include one or more of the following features. The aspect can further include monitoring for modifications to one or more items of the plurality of items during the backup operation, completing the backup operation, and performing a second backup for the modified items. Interrupting the backup operation can include receiving a user input that causes the backup to be interrupted. Receiving the user input can include receiving a log out request or receiving a shut down request. Interrupting the backup can include interrupting the backup in response to a system crash. Receiving an input to resume the backup operation includes receiving a user request to resume the backup. Receiving an input to resume the backup operation can include receiving an automatic request to resume the backup. An automatic request to resume can be received when a user logs into the system after interrupting the backup operation.

Identifying a previously completed portion of the backup can include identifying backup data written to the backup before the backup was interrupted. Identifying backup data written to the backup can include identifying a timestamp of the backup data. Identifying backup data written to the backup can include identifying backup data that has not been marked as complete. Identifying a previously completed portion of the backup can include identifying a portion of a file system included in the completed portion.

In general, in one aspect, a method is provided. The method includes initiating a backup operation, determining whether a partially completed backup exists, when a partially completed backup exists, determining whether to resume the partially completed backup, and completing the backup using the partially completed backup when resuming the partially completed backup. Other embodiments of this aspect include corresponding systems, apparatus, computer program products, and computer readable media.

Implementations of the aspect can include one or more of the following features. Initiating a backup operation can include receiving a user input to initiate a backup operation. Initiating a backup operation can be according to a specified schedule. Determining whether a partially completed backup exists can include identifying backup data and determining whether the data is marked as complete. Determining whether a partially completed backup exists can include comparing time stamped backup data with a timestamp for a last completed backup. Determining whether to resume the partially completed backup can include prompting the user to indicate whether to resume the partially completed backup.

Particular embodiments of the subject matter described in this specification can be implemented to realize one or more of the following advantages. A partially completed backup operation can be resumed at a later time without restarting the backup operation. Resuming a partially completed backup operation provides efficient backup operations.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
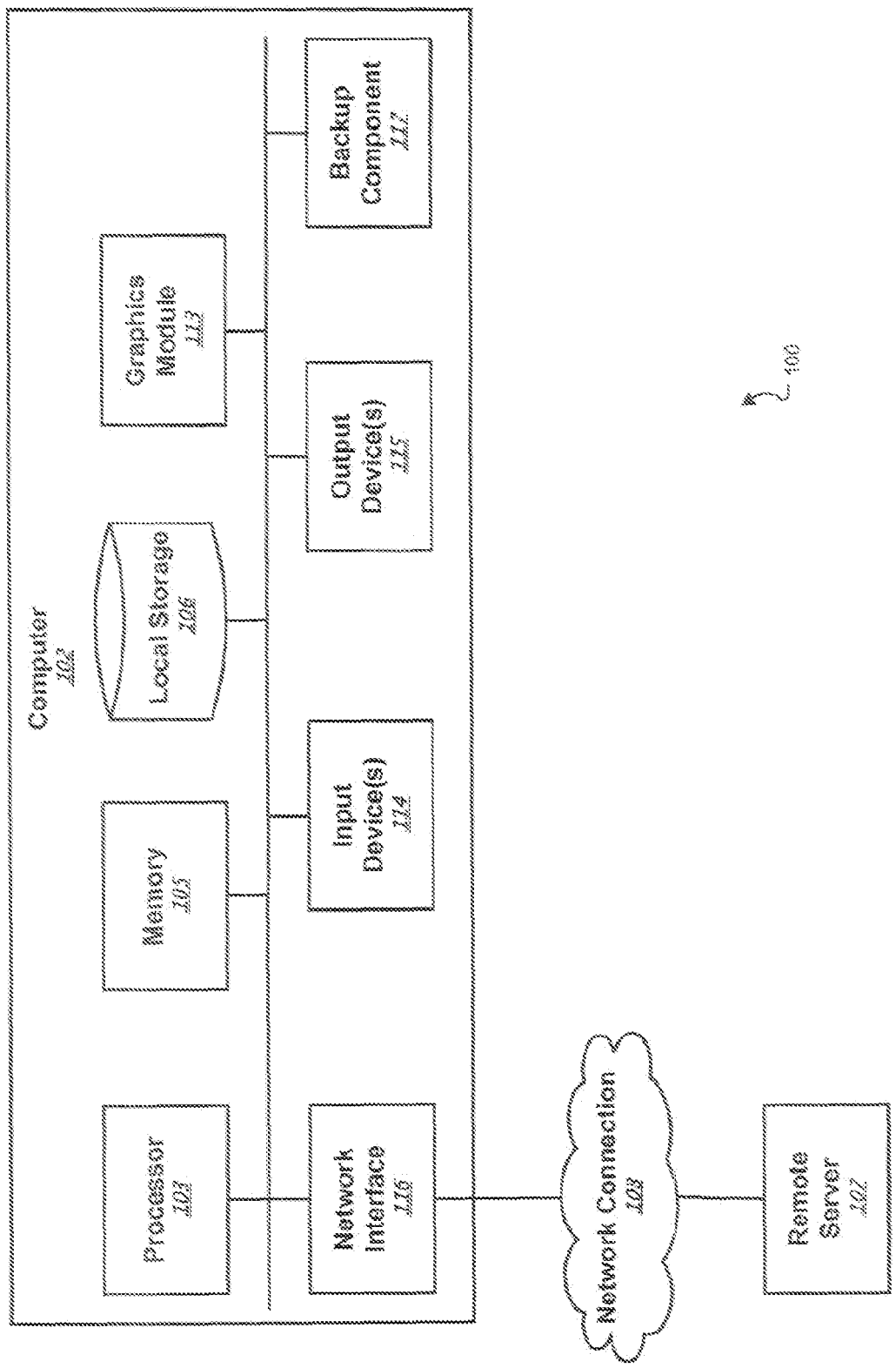
FIG. 1 is a block diagram of an example computer system.

FIG. 1 is a block diagram of an example computer system 100. The system 100 can be used for backup operations including capturing at least one earlier version of a user interface view and allowing a user to initiate a restoration based on the captured earlier version. As used herein, a view refers to an item, element or other content, capable of being presented in a user interface, that can be subjected to a backup operation by a backup component 117 included in system 100. For example, a user interface view can contain any number of icons, files, folders, application state information and/or machine state information, etc.

The system 100 includes a personal computer 102, communicatively coupled to a remote server 107 using a network interface 116, and a network 108 (e.g., local area network, wireless network, Internet, intranet, etc.). The computer 102 generally includes a processor 103, memory 105, one or more input devices 114 (e.g., keyboard, mouse, etc.), and one or more output devices 115 (e.g., a display device). A user interacts with the system 100 using the input and output devices 114, 115. The system 100 also includes various hardware elements. The system 100 can include hardware, software, and combinations of the two.

The computer 102 also includes a local storage device 106 and a graphics module 113 (e.g., a graphics card) for storing information and generating graphical objects, respectively. The local storage device 106 can be a computer-readable medium. The computer-readable medium can be a machine-readable storage device, a machine-readable storage substrate, a memory device, a composition of matter effecting a machine-readable propagated signal, or a combination of one or more of them.

While modifications of a user interface view are described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

Systems and methods are provided for modifying an interface view (e.g., a user interface view). Systems and methods are also provided for handling interruptions during backup operations. The systems and methods can be stand alone, or otherwise integrated into a more comprehensive application.

Though discussion is made with reference to modifying a user interface view, those of ordinary skill will recognize that such a view can be based on various data structures, files, processes, and other aspects of information management. It follows that modification to file structures, data and the like is also contemplated in order to achieve the modification of the user interface view. In other words, while the restoration of the user interface view from one state to another can be the most apparent change from the user's perspective, this is accomplished through the corresponding changes in the underlying system content.

One of ordinary skill in the art will recognize that the engines, methods, processes and the like that are described can themselves be an individual process or application, part of an operating system, a plug-in, an application or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described below.

A system and method for modifying a user interface view can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes the backup component 117 that allows for the storage of versions of the computer's files or other items, for example within the local storage 106 or in an external storage repository. In one implementation, the backup component 117 also allows a user to select any of the stored versions and use the selected version to initiate a restoration of that version in the computer.

Figure 2:
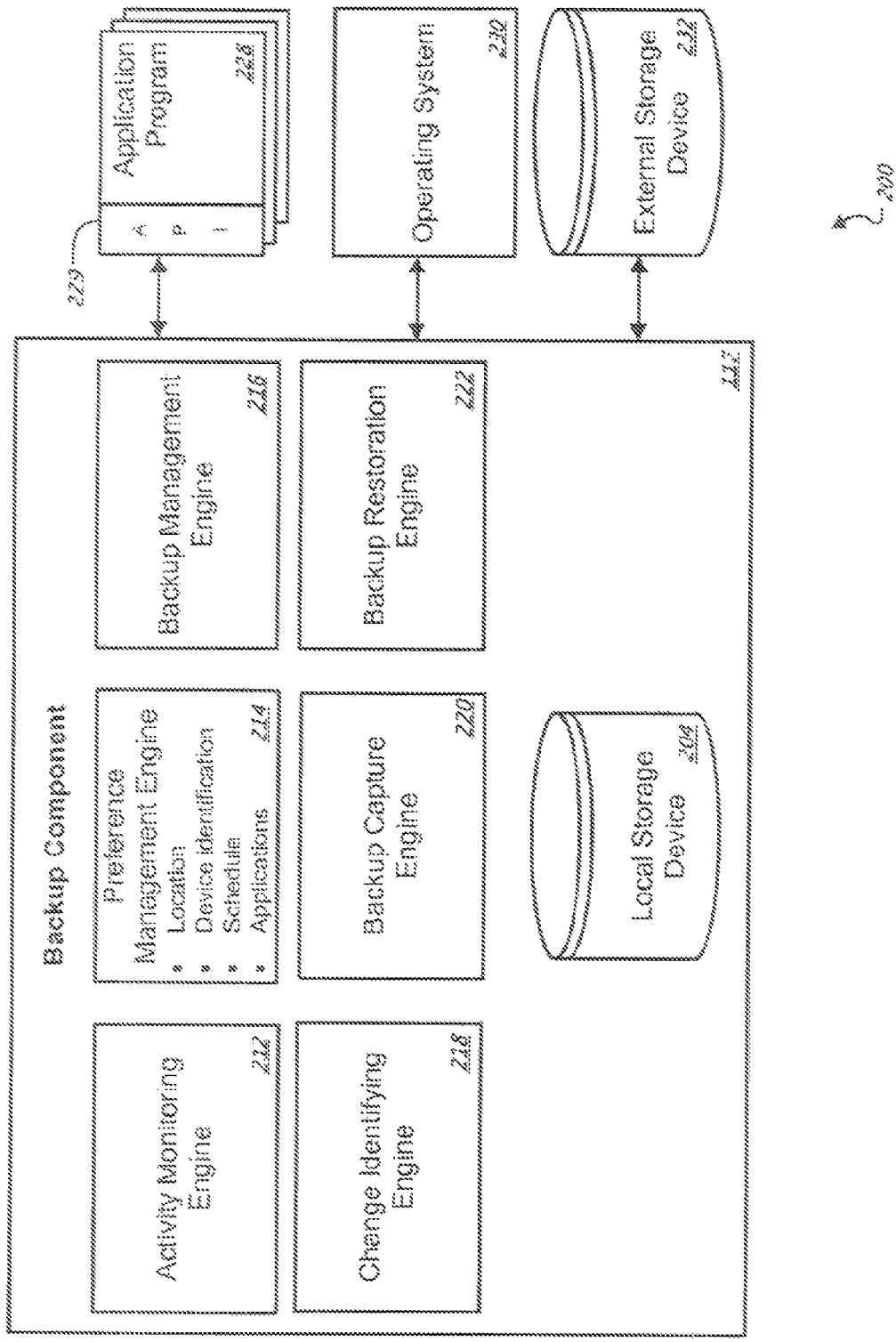
FIG. 2 is a block diagram of an example architecture for providing backup and restoration of data.

FIG. 2 is a block diagram of an example architecture 200 for providing backup and restoration of data. The architecture 200 (e.g., a software architecture) can be used for enabling the back up and restoration of elements and items, e.g., application files, application data, settings, parameters, and other data including, for example, data associated with a set of applications 228.

In some implementations, each application 228 can include an application programming interface (API) 229. The architecture 200 can utilize API techniques to access applications 228 and enhance the applications 228 with additional functionality. For example, the API 229 can link several applications 228 together for providing a single service on all linked applications. Particularly, the backup component 117 can utilize API techniques to enhance the applications 228 with the functionality of the backup component 117. The API tools can link several applications to the backup component 117 by using an API 229 to provide a similar menu or icon for each of one or more applications 228. For example, the API 229 can be used by the backup component 117 when generating a backup view corresponding to a current state of the subject application 228.

As another example, the API 229 can be used when the application 228 is restored, using the backup component 117, to a prior view representing a prior state of the application. Although the API 229 is shown in FIG. 2 as part of application programs 228, the API can be separate from the application programs 228. For example, the API 229 can be separately located and made available by the system for use by one or more of the application programs 228.

In one implementation, the backup component 117 provides back up and restoration capability for the system 100. Many different items or elements can be the subject of a backup operation in the system 100. For example, folders, files, items, information portions, directories, images, system parameters, playlists, address books, e-mails, e-mail folders, application states, and the like all can be candidates for inclusion in an archive as backup data. Other types of data can be included as backup data.

In some implementations, the backup component 117 can include a local storage device 204 and an external storage device 232. The backup data can be stored on either or both. Any number of local and/or external storage devices can be used by the backup component 117 for storing backup data. In one implementation, no local storage is provided. In one implementation, the backup component 117 stores the backup data in a format corresponding to a file system structure. Backup data can be stored incrementally during a backup operation where backup data is periodically written to a particular storage device.

In one implementation, one copy of original data (e.g., folders, files, items, information portions, directories, images, system parameters, playlists, address books, e-mails, e-mail folders, application states, preferences, and the like) is stored in the system as backup data (e.g., an original version of the data). When one or more subsequent sets of backup data, or versions, of the data are generated through subsequent backup operations, the backup data can contain only the differences between a current data version and the prior backup data, thereby saving storage space. In some implementations, the storage devices 204 and 232 can be used to store the original backup data as well as links pointing to the original backup data. The links can be hard links which reference, or point to, physical data, or as another example can be symbolic links that reference another file on the storage device (e.g., by name or location).

The backup component 117 can interact with one or more of the applications using the corresponding API 229. In one implementation, the interaction allows the backup component 117 to perform backup operations to capture a view of the application including the particular application's files, state, or other items, and can provide for user restoration of selected backup data, to name two examples.

In another implementation, the backup component 117 runs as a background task on an operating system 230, where the task is generally not visible to the user. The backup component 117 can be configured to run across multiple user accounts.

The backup component 117 includes an activity monitoring engine 212. In one implementation, the activity monitoring engine 212 monitors for changes within data (e.g., files or application states) targeted for inclusion in backup operations. A change can also include the addition of new files or other data structures and the modification or deletion of existing ones. For example, the activity management engine 212 can be responsible for verifying the integrity of a playlist in a music file management program, or for verifying that a corresponding song file exists for a listed song.

In one implementation, the activity monitoring engine 212 is capable of discerning between a substantive change (e.g. the text within a document has been modified) and a non-substantive change (e.g. the play count within an iTunes playlist has been updated, or several changes cancel each other out) through the activity monitoring engine's interaction with the application programs 228. The activity monitoring engine 212 can, for example, create a list of modified elements (e.g., files) to be used when a backup operation is eventually triggered. In one implementation, the activity monitoring engine 212 can monitor the system for periods of inactivity. The activity monitoring engine 212 can then trigger a backup operation during a period of time in which the backup operation will not cause a system slowdown for an active user.

A preference management engine 214 specifies some operating parameters of the backup component 117. In one implementation, the preference management engine 214 contains user-specified and/or system default application parameters for the backup component 117. These can include settings for the details of capturing and storing the views. For example, the preference management engine 214 can determine the frequency of backup operations, the storage location for the backup data, the types of elements (e.g., files or other items) that are eligible for inclusion in backup operations, and the events which trigger a backup operation (periodic or event-driven, etc.).

The preference management engine 214 can, in some implementations, determine what steps are to be taken in the event that a backup operation is interrupted, for example, due to a system shutdown, a user logging out, or an unexpected system failure. For example, the preference management engine 214 can determine if and when an alert can be generated regarding the interruption of a backup operation and/or the ability to complete a previously interrupted backup operation.

In one implementation, the preference management engine 214 can detect that a new storage device is being added to the system and prompt the user whether the new storage device should be included as a backup repository. Files and other items can be scheduled for a backup operation due to location (e.g. everything on the C: drive and within D:/photos), a correlation with specific applications (e.g. all pictures, music, e-mail in an inbox, an address book, and system settings), or a combination of strategies. Different types of items can be scheduled to be stored on different devices or on different segments of a storage device during a backup operation.

A backup management engine 216 coordinates the collection, storage, and retrieval of views performed by the backup component 117. For example, the backup management engine 216 can trigger the activity monitoring engine 212 to monitor for activities that satisfy one or more criteria specified in the preference management engine 214 for initiating a backup operation.

A change identifying engine 218 locates specific element (e.g., files or other items) to determine if data associated with the elements has changed. The change identifying engine 218 can be capable of discerning a substantive change from a non-substantive change. For example, the change identifying engine 218 can identify a loss of data associated with a user's current view. In one implementation, the change identifying engine 218 traverses a target set of files or other items, comparing a previous version to the current version to determine whether or not a modification has occurred. In addition, the change identifying engine 218 can generate an alert identifying the loss of data and prompt the user to initiate a previous version of the current view to restore the lost data. For example, the change identifying engine 218 can be responsible for verifying whether a data loss has occurred in a music file management program or for verifying that a corresponding song file is unchanged for a listed song.

A backup capture engine 220 locates views (e.g., elements, files or other items) that are to be included in a backup operation. The backup capture engine 220 can invoke the activity monitoring engine 212 and/or the change identifying engine 218, for example, to generate a capture list identifying data to be included in a next backup operation. The backup capture engine 220 can then store copies of listed data in one or more targeted storage repositories. The backup capture engine 220 can track multiple versions of elements or items included in the backup repository.

The backup component 117 includes a backup restoration engine 222 to restore previous versions of views (e.g., files or other items). In one implementation, the backup restoration engine 222 provides a user interface (e.g., a graphical user interface) where a user can select the item(s) to be restored.

The backup restoration engine 222 can initiate backup operations on one or more data elements or items as directed by a user, the system, or according to a specified or otherwise defined schedule. For example, the user can set up a scheduled backup operation to occur for any number of data files. The data files can be related to one another, such as when the files share similar attributes or a schema. For example, several files included on one particular webpage can have a similar schema and can require versions of each related file to remain consistent to display a successful webpage image.

Unless the backup operation is completed in a very short amount of time, there is a chance that one or more of the files to be included in the backup can be modified before the backup operation is complete. For example, the backup operation can be performed while a computer system is in use (e.g., executing operation received from a user). The use of the computer system during a backup operation can introduce inconsistencies, for example, between backed up data files and data files currently awaiting the backup operation.

In another example, if the backup operation is interrupted (e.g., because of a user logout, system shutdown, or system crash) and later completed, there is a chance that one or more of the files pending inclusion in the backup can be modified before the backup operation is complete. In these examples, such changes are monitored and the backup operation can be tailored to take them into account. If inconsistencies are found between files, the backup restoration engine 222 can attempt to resolve any discrepancies between data files, as described in greater detail below.

Figure 3:
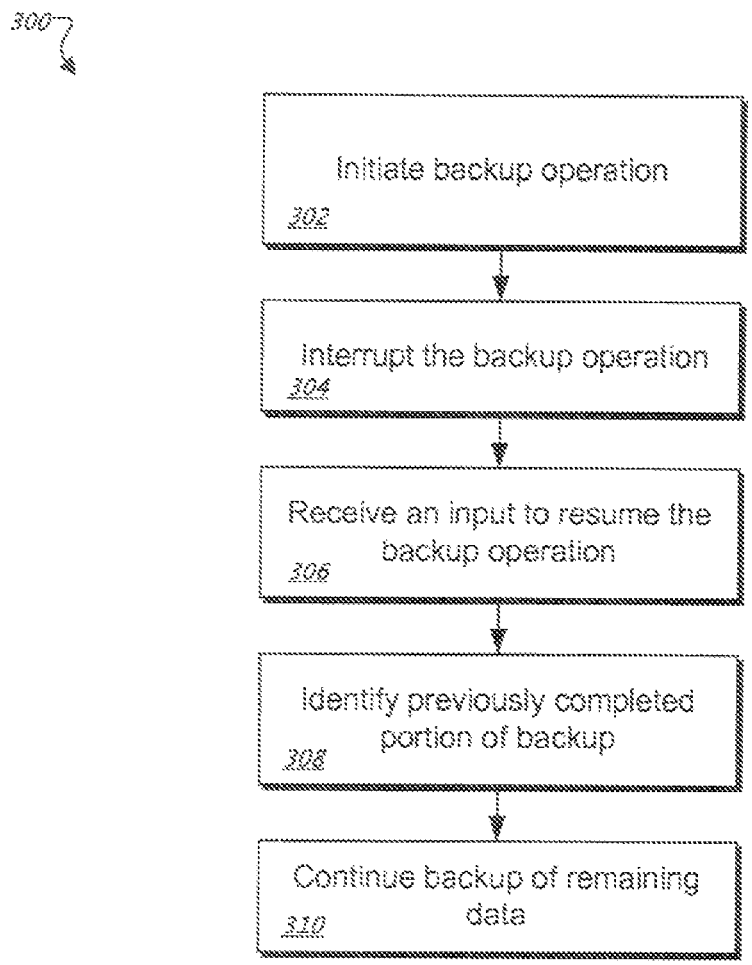
FIG. 3 is a flow chart of an example method for resuming an interrupted backup operation.

FIG. 3 is a flow chart of an example method 300 for resuming an interrupted backup operation. For convenience, the method 300 will be described with reference to a system (e.g., system 100) performing the method 300. The system initiates (302) a backup operation. For example, a user can choose to back up files and/or folders according to a specified time schedule. The backup component (e.g., backup component 117) can begin the backup operation according to the specified time schedule.

During the backup operation, the backup component writes (e.g., periodically) backup data to a storage device. For example, the backup component can write data in a temporary manner (e.g., in a temporary location, marked as incomplete, etc.). Alternatively, the backup component can write the data as part of the backup on the storage device, which is not marked as complete until the backup operation has finished. For example, when backing up a large amount of data, the backup data can be written incrementally as portions of the backup operation are performed. In some implementations, the data has the form of a file system and backup data is written as portions of the file system are traversed during the backup operation. The data written to the storage device, in this example, can also include a timestamp. The timestamp can indicate the time at which the backup data was written to the backup.

The system interrupts (304) the backup operation. In some examples, a system reboot occurs in the middle of the backup operation, the system crashes, or the user logs out. When the backup operation is interrupted, only a partial backup has been completed. Consequently, only a portion of the data elements scheduled for inclusion in the backup have been written to the storage device.

The system resumes (306) the interrupted backup operation. The resumption of the backup operation can occur, for example, automatically when the system starts up again or when the user logs on again. Alternatively, resumption of backup operation can be initiated according to a user request or when the next backup operation is triggered (e.g., according to a specified time schedule or in response to one or more backup events). In some implementations, the backup component prompts the user whether or not an incomplete backup operation should be resumed or a new backup operation begun.

The system identifies (308) the previously completed portion of the backup. For example, a backup capture engine (e.g., backup capture engine 220 (FIG. 2)) can locate a partially completed backup by comparing timestamps on written backup data to the timestamp of the last completed backup operation. Additionally, the partially completed backup can be identified according to backup data that has not been marked as complete. In comparing the data stored in the partially completed backup with the schedule data to be included in the backup, a remaining set of data can be determined.

Using the remaining set of data, the system continues (310) the backup operation. For example, the identified data that has not yet been backed up can be added to the partial backup to provide a completed backup. In some implementations, the backup data is stored as a file system hierarchy. Completing the backup operation includes completing the backup of elements in the file system hierarchy that were scheduled to be included in the backup. In some implementations, when the backup operation is completed, the backup data is marked as a completed backup. The completed backup can also include a timestamp, for example, to compare the backup data of the completed backup with backup data from previous backup operations or future partial backups.

In some implementations, the procedures described in method 300 can be performed in a different order or in combination with each other, and more or fewer steps can be taken for the interrupted backup operation to complete. For example, in some implementations, the backup capture engine locates a partially completed backup and triggers the backup operation to resume. In another example, the interrupted backup operation can be canceled (e.g., by the system or by a user). In an alternative example, additional interruptions and resumptions could occur before a backup operation completes.

Figure 4:
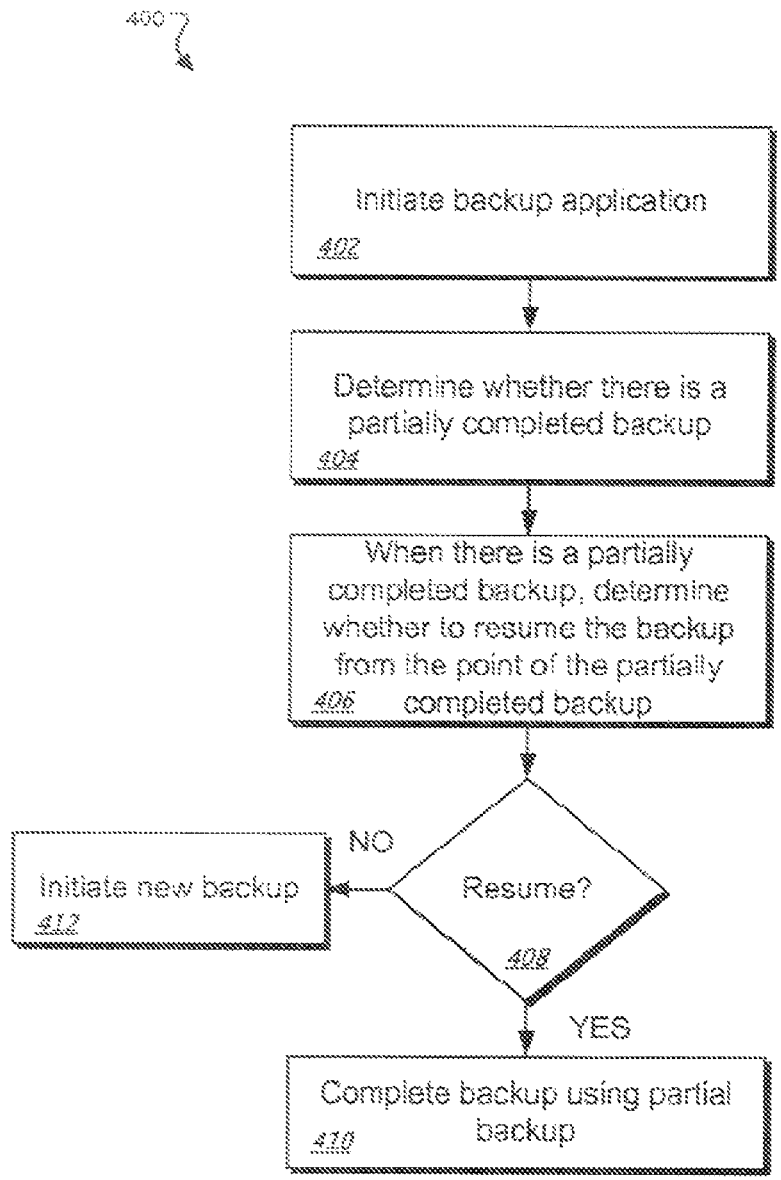
FIG. 4 is a flow chart of an example method for performing a backup operation.

FIG. 4 is a flow chart of an example method 400 for performing a backup operation. For convenience, the method 400 will be described with reference to a system (e.g., system 100 including backup component 117) performing the method 400. The system initiates (402) a backup operation. For example, a user can choose to initiate a backup operation on files or folders upon system start (e.g., as the backup component 117 initializes). Alternatively, the initiated backup operation can be according to a specified schedule (e.g., hourly) or in response to one or more events (e.g., a specified number of detected data changes).

The system determines (404) whether a partially completed backup has occurred. A backup operation may fail to complete, in one example, due to a system failure on the computer 102. In some implementations, the system (e.g., as backup restoration engine 222 or the change identifying engine 218 of the backup component 117), can identify a partially completed backup by traversing the backup data for stored backup data that is not marked as completed. Additionally, the backup data that is not completed can have a timestamp that is later than the most recent backup data marked as a completed backup.

Alternatively, the system can identify backup data stored within a temporary directory, or those containing a more recent timestamp than the time at which the last full backup operation completed. In some implementations, the backup component can recognize an interruption as it occurs (e.g., due to a voluntary shutdown or log off operation) and write an interrupt indicator such as a flag that identifies the partially completed backup.

If the system identifies a partially completed backup, the system determines (406) whether to resume the incomplete backup operation. In some implementations, the user can be prompted to provide an input indicating whether or not the backup operation should be resumed, or whether, alternatively, the partially completed backup should be discarded. In other implementations, the system (e.g., the preference management engine 214) can have a parameter specifying when to resume an incomplete backup operation.

When a partially completed backup is resumed, the system completes (410) the interrupted backup operation using the partial backup data. For example, when the backup data is stored as a file system hierarchy, the elements of the file system hierarchy that were not yet included are added to the backup data. Additionally, once completed, the backup data can be flagged as a completed backup. In some implementations, when resuming the backup operation the system determines whether or not there have been changes to data previously stored in the partial backup. For example, a change identifying engine (e.g., change identifying engine 218) can check the partial backup data provided by a backup capture engine (e.g., backup capture engine 220) to verify that none of the items have changed since the previous backup operation was interrupted. The change identifying engine can provide an updated list of items to the backup capture engine so that the backup capture engine can complete the interrupted backup operation.

When a partially completed backup does not exist, or when the system determines (408) that the partially completed backup operation should not be resumed, the system initiates (412) a new backup operation. The new backup operation includes identifying modified data with respect to the most recently completed backup operation, if any, and generating a new backup including storing changed data. For example, the change identifying engine can generate a new list of modified items for the backup capture engine to use during the backup operation.

Figure 5:
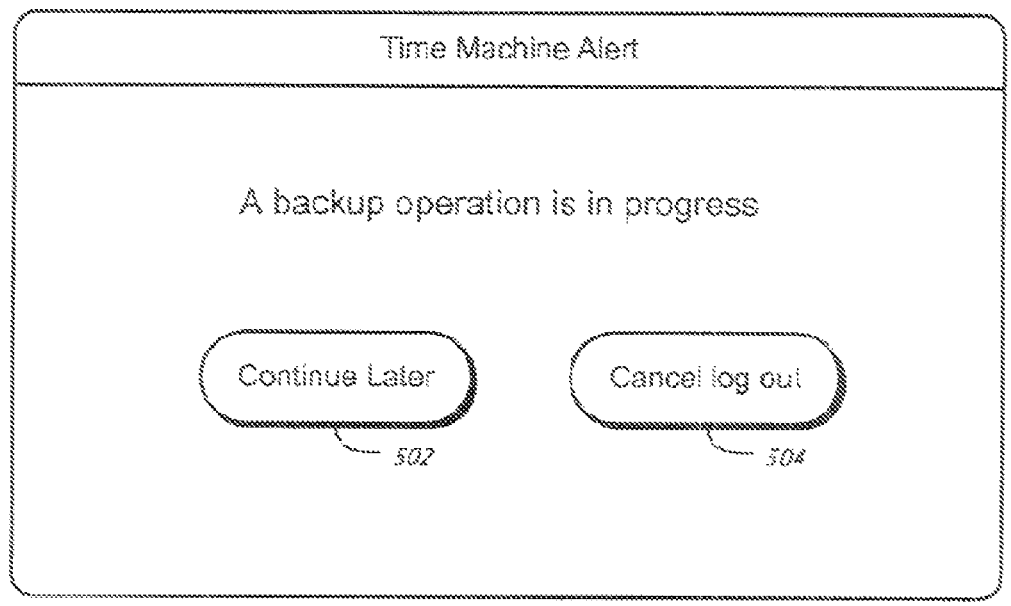
FIG. 5 shows a screen shot depicting an example of an ongoing backup procedure alert.

FIG. 5 shows a screen shot depicting an example of an ongoing backup procedure alert 500. Since backup operations can occur in the background, a user may be unaware that a backup operation is in progress. In one implementation, the alert 500 is generated by the activity monitoring engine 212 or the backup management engine 216 (FIG. 2). Within the alert 500, the user is warned that a backup operation is currently in progress. The alert 500 may be generated, for example, in response to a user attempting to log out of the computer 102 during an ongoing backup operation. A similar alert, in some implementations, may be generated in response to an attempt to shut down the backup component 117 or the computer 102 during a backup operation.

A user can select a "continue later" button 502 to request that the backup component 117 resume the backup operation at a later point in time (e.g., after the user logs back into the computer 102). A user can instead select a "cancel log out" button 504 so that the user may remain logged in while the backup operation runs to completion. Alternatively, in some implementations, a presented button allows the user to cancel the current backup operation and continue with the log out, shut down, or other operation that triggered the interrupt. In some implementations, if the user cancels the backup operation, the partial backup data is discarded. In an alternative implementation, if the user continues with the log out, the backup process can be immediately terminated or otherwise stopped at an appropriate point (e.g., after writing any processed, but unwritten, backup data).

Figure 6:
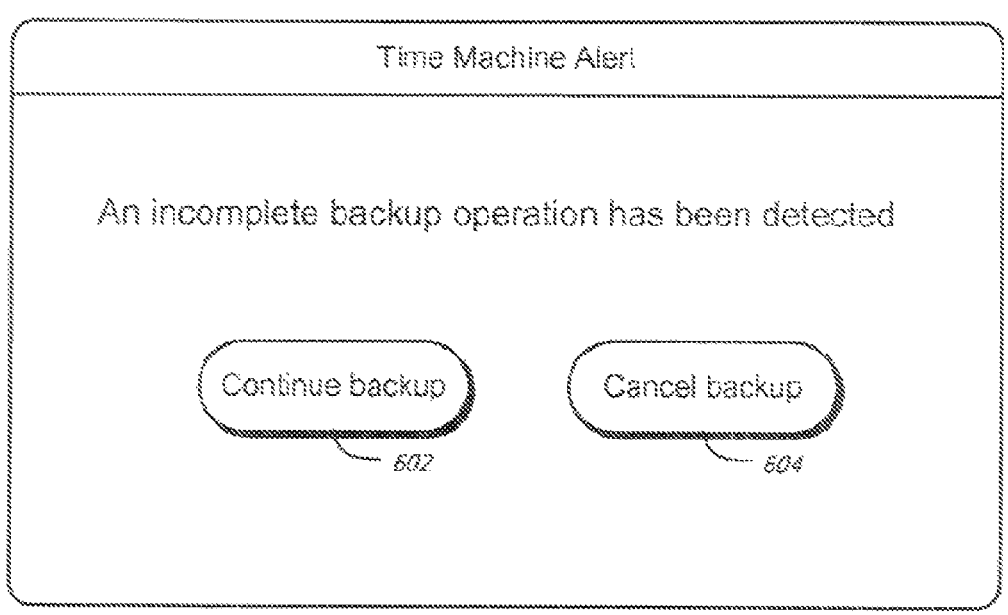
FIG. 6 shows a screen shot depicting an example of an interrupted backup procedure alert.

FIG. 6 shows a screen shot depicting an example of an interrupted backup procedure alert 600. In one implementation, the alert 600 is generated by change identifying engine 218 or the backup management engine 216 (FIG. 2). Within the alert 600, the user is warned that an incomplete set of archive data exists due to an interrupted backup operation. The alert 600 can be generated, in some implementations, in response to a user logging into the computer 102 after an interrupted backup operation, during start up of the computer 102, or at the point of a next scheduled backup operation.

A user can select a "continue backup" button 602 to request that the backup component 117 resume the previously interrupted backup operation. Alternatively, the user can instead select a "cancel backup" button 604 so that the interrupted backup operation is canceled. In some implementations, upon selection of the cancel backup option, the backup data of the partially completed backup are discarded. Additionally, in some implementations, selection of the cancel backup option results in the initiation of a new backup operation.

Figure 7A:
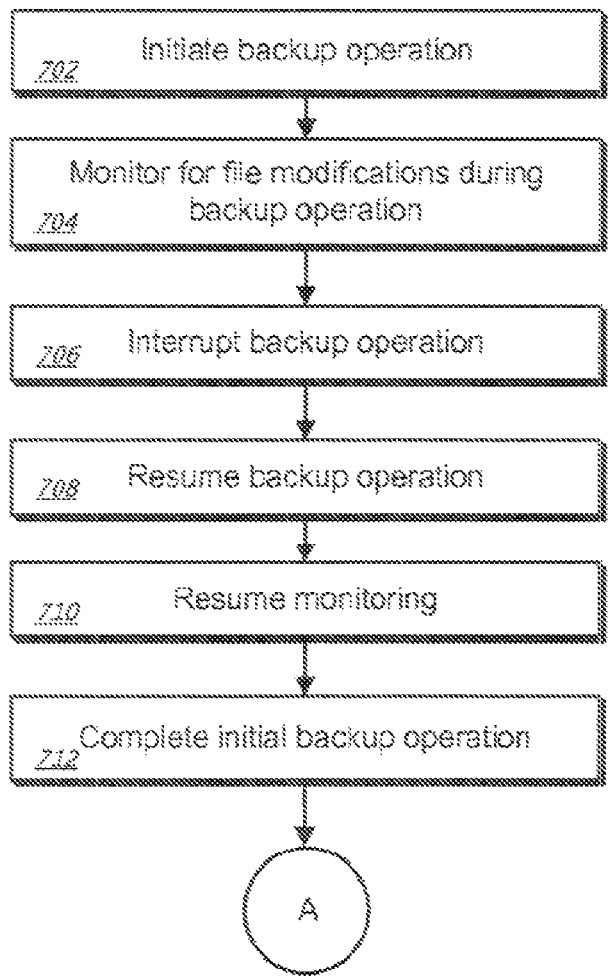
FIGS. 7A and 7B are a flow chart of an example operation that can be performed when a backup procedure is interrupted and later resumed.
Figure 7B:
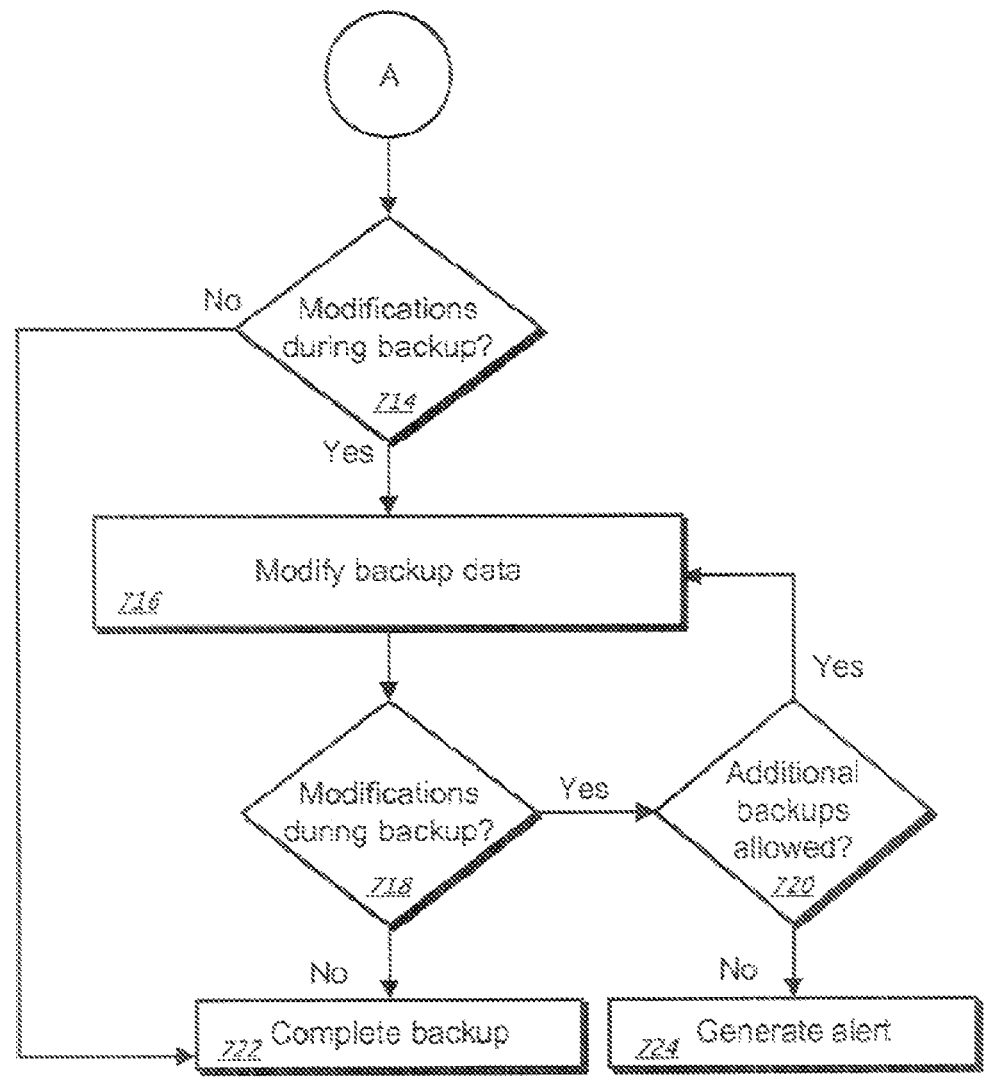

FIGS. 7A and 7B are a flow chart of an example backup operation 700. The backup operation 700 can be performed, for example, to backup elements or items, including data files and folders. For convenience, the method 700 will be described with reference to a system (e.g., system 100 including backup component 117) performing the method 700.

The system initiates (702) a backup operation. For example, a user can choose to initiate a backup operation of data including, for example, files or folders stored in a storage device. The backup component (e.g., backup component 117) can begin the backup operation according to the specified time schedule. The system monitors (704) for modifications to one or more items during the backup operation. For example, the backup component can monitor file changes made by a user and determine whether or not the modifications cause an inconsistency between related items, such as the individual files used in combination for displaying a single web page.

In some implementations, the backup component can initially ignore modifications that have been made to related files, and back up the original files before determining whether or not the modifications cause an inconsistency in the files. Alternatively, in some implementations, the backup component can simply monitor for any changes to items occurring during the backup operation regardless of the items' relationship to any other item. In particular, the backup component monitors for changes to items already stored in the backup data as part of the backup operation in progress.

The system interrupts (706) the backup operation. An interruption can occur, for example, due to a system shutdown, system failure, or user disconnection, or a manual user cancellation of the backup operation.

The backup operation resumes (708) at a later point in time, for example, as described above. The system resumes (710) monitoring for modifications. In addition to monitoring current modifications, in some implementations the monitoring task determines whether or not changes were made to items in the interval between the interruption (706) of the backup operation and the resumption (708) of the backup operation.

The system completes (712) the initial backup operation. The system determines (714) whether or not modifications have occurred during the backup operation. A query can be sent, for example, to a backup management engine to determine whether or not modifications occurred during a particular backup operation. If modifications did not occur during the backup operation, the system determines (722) that the backup operations are complete and the backup data is stored for later use.

If modifications occurred during the backup operation, or between interruption and resumption of the backup operation, the backup component modifies (716) the backup data. In one implementation, the backup data can be modified to correspond to the state that the files (or other items) have at the end of the initial backup operation. In another implementation, the backup data can be modified to correspond to the state that the files (or other items) have at the beginning of their initial backup operation. In some implementations, the user can be given a prompt or an option to decline further backup operations. For example, when a modification is insignificant to the structure and content of the files (e.g., a title change or file name change), the system can present a pop-up window containing a decline or ignore option.

Upon completion of the backup modification operation, the system determines (718) whether or not modifications have occurred during the backup modification operation. If modifications did not occur during the backup modification operation, the system determines (722) that the backup is complete. When modifications have occurred during a backup modification operation, a query can be sent to determine (720) whether or not additional backup modification operations are permitted. For example, a user can set a maximum number of backup modification operations that can be carried out by configuring the backup component with a specified number of iterations. If further backup modification operations are allowed, the backup operation can be performed (716) again to resolve the inconsistencies.

The system can attempt to resolve inconsistencies by performing steps 716, 718, and 720 until the maximum number of iterations has been reached. Upon reaching the maximum number of backup modification operations, the system can generate 724 an alert to the user. The alert can notify the user of the intended resolution and can allow the user to decline, continue, or modify the backup operation. In some implementations, the user can choose to be prompted each time the time machine engine triggers the performance of the backup modification operation.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter affecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:
    initiating an initial backup operation of data including a plurality of items;
    interrupting the initial backup operation after a portion of the data is backed up;
    associating the backed up data with a timestamp;
    receiving an input to resume the initial backup operation;
    comparing the timestamp with a timestamp of a last completed backup operation;
    based on the comparing, resuming the initial backup operation to back up a remaining portion of the data;
    completing the initial backup operation;
    monitoring for modifications to one or more items of the plurality of items during the initial backup operation; and
    upon determining that one or more items of the plurality of items were modified during the initial backup operation, modifying the backed up data based on the determination,
    where the method is performed by one or more processors.

2. The method of claim 1, further comprising:
    monitoring for modifications to one or more items of the plurality of items during the modifying of the backed up data; and
    upon determining that one or more items of the plurality of items were modified during the modifying of the backed up data, further modifying the backed up data based on the determination.

3. The method of claim 1, further comprising:
    repeating, until a stop condition is met:
        monitoring for modifications to one or more items of the plurality of items during the modifying of the backed up data; and
        upon determining that one or more items of the plurality of items were modified during the modifying of the backed up data, further modifying the backed up data based on the determination.

4. The method of claim 3, wherein the stop condition corresponds to a determination that none of the plurality of items were modified during the modifying of the backed up data.

5. The method of claim 3, wherein the stop condition corresponds to a determination that a number of repetitions has exceeded a pre-determined number.

6. The method of claim 1, further comprising:
    monitoring for modifications to one or more items of the plurality of items after competition of the initial backup; and
    upon determining that one or more items of the plurality of items were modified after completion of the initial backup, further modifying the backed up data based on the determination.

7. The method of claim 1, wherein interrupting the initial backup operation includes at least one of receiving a user input that causes the initial backup operation to be interrupted or interrupting the initial backup operation in response to a system crash.

8. The method of claim 1, wherein receiving an input to resume the initial backup operation includes at least one of receiving a user request to resume the initial backup operation or receiving an automatic request to resume the initial backup operation.

9. The method of claim 1, wherein identifying the completed portion of the backup data includes at least one of identifying backup data written to a backup before the initial backup operation was interrupted or identifying a portion of a file system included in the completed portion.

10. A computer program product encoded on a tangible, non-transitory storage medium, the product comprising computer readable instructions for causing one or more processors to perform operations comprising:
    initiating an initial backup operation of data including a plurality of items;
    interrupting the initial backup operation after a portion of the data is backed up;
    associating the backed up data with a timestamp;

receiving an input to resume the initial backup operation;

comparing the timestamp with a timestamp of a last completed backup operation;

based on the comparing, resuming the initial backup operation to back up a remaining portion of the data;

completing the initial backup operation;

monitoring for modifications to one or more items of the plurality of items during the initial backup operation; and upon determining that one or more items of the plurality of items were modified during the initial backup operation, modifying the backed up data based on the determination.

11. The computer program product of claim 10, wherein the operations further comprise:

monitoring for modifications to one or more items of the plurality of items during the modifying of the backed up data; and upon determining that one or more items of the plurality of items were modified during the modifying of the backed up data, further modifying the backed up data based on the determination.

12. The computer program product of claim 11, wherein the operations further comprise:

repeating, until a stop condition is met:

monitoring for modifications to one or more items of the plurality of items during the modifying of the backed up data; and upon determining that one or more items of the plurality of items were modified during the modifying of the backed up data, further modifying the backed up data based on the determination.

13. The computer program product of claim 12, wherein the stop condition corresponds to a determination that none of the plurality of items were modified during the modifying of the backed up data.

14. The computer program product of claim 12, wherein the stop condition corresponds to a determination that a number of repetitions has exceeded a pre-determined number.

15. The computer program product of claim 10, wherein the operations further comprise:

monitoring for modifications to one or more items of the plurality of items after competition of the initial backup; and upon determining that one or more items of the plurality of items were modified after completion of the initial backup, further modifying the backed up data based on the determination.

16. The computer program product of claim 10, wherein interrupting the initial backup operation includes at least one of receiving a user input that causes the initial backup operation to be interrupted or interrupting the initial backup operation in response to a system crash.

17. The computer program product of claim 10, wherein receiving an input to resume the initial backup operation includes at least one of receiving a user request to resume the initial backup operation or receiving an automatic request to resume the initial backup operation.

18. The computer program product of claim 10, wherein identifying the completed portion of the backed up data includes at least one of identifying backup data written to a backup before the initial backup operation was interrupted or identifying a portion of a file system included in the completed portion.

* * * * *